July 18, 1933.  W. J. PHELPS  1,918,662
MACHINE FOR SIDE SEAMING CAN BODIES
Filed Jan. 11, 1932  4 Sheets-Sheet 4
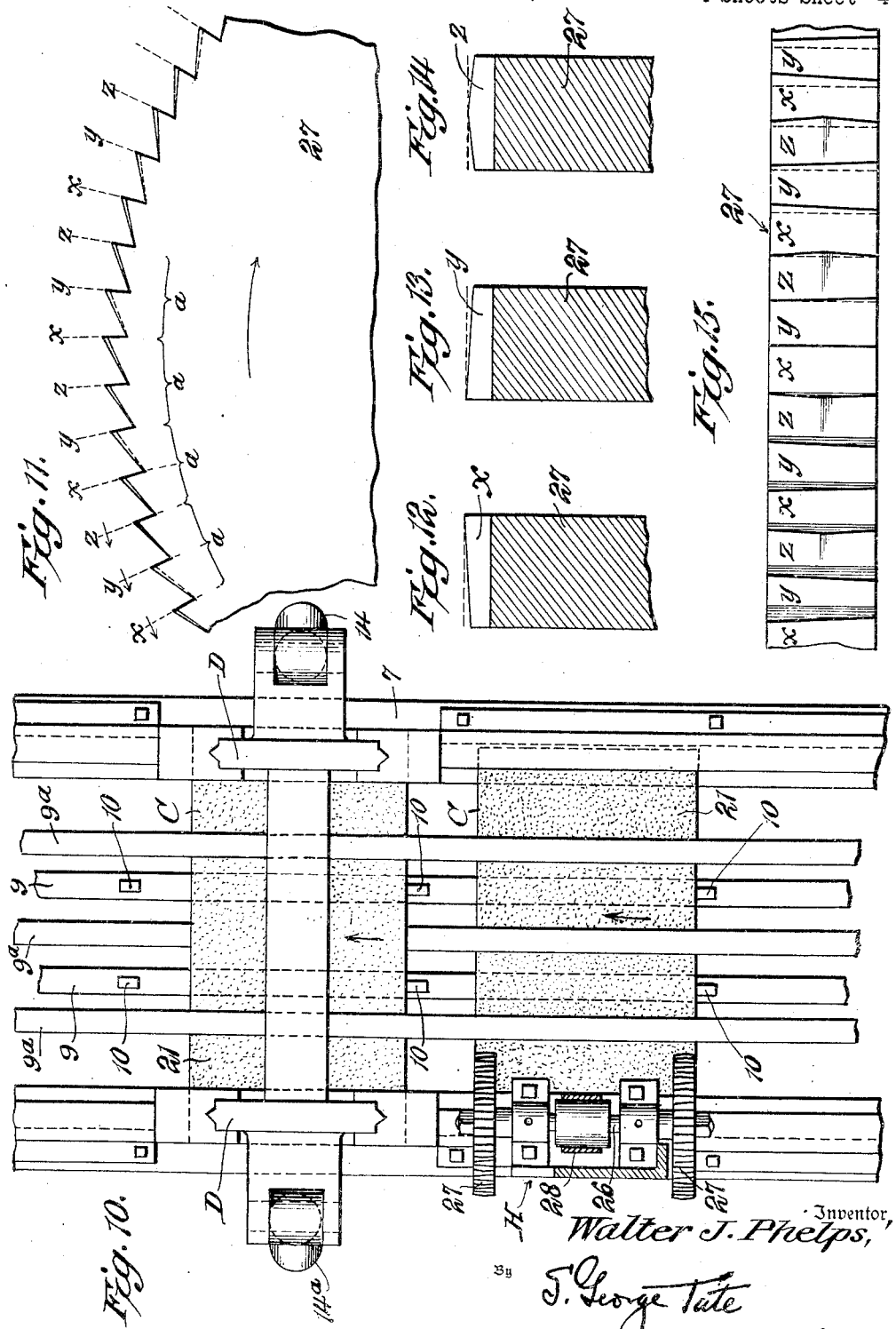
Inventor,
Walter J. Phelps,
By J. George Tate
Attorney Patented July 18, 1933

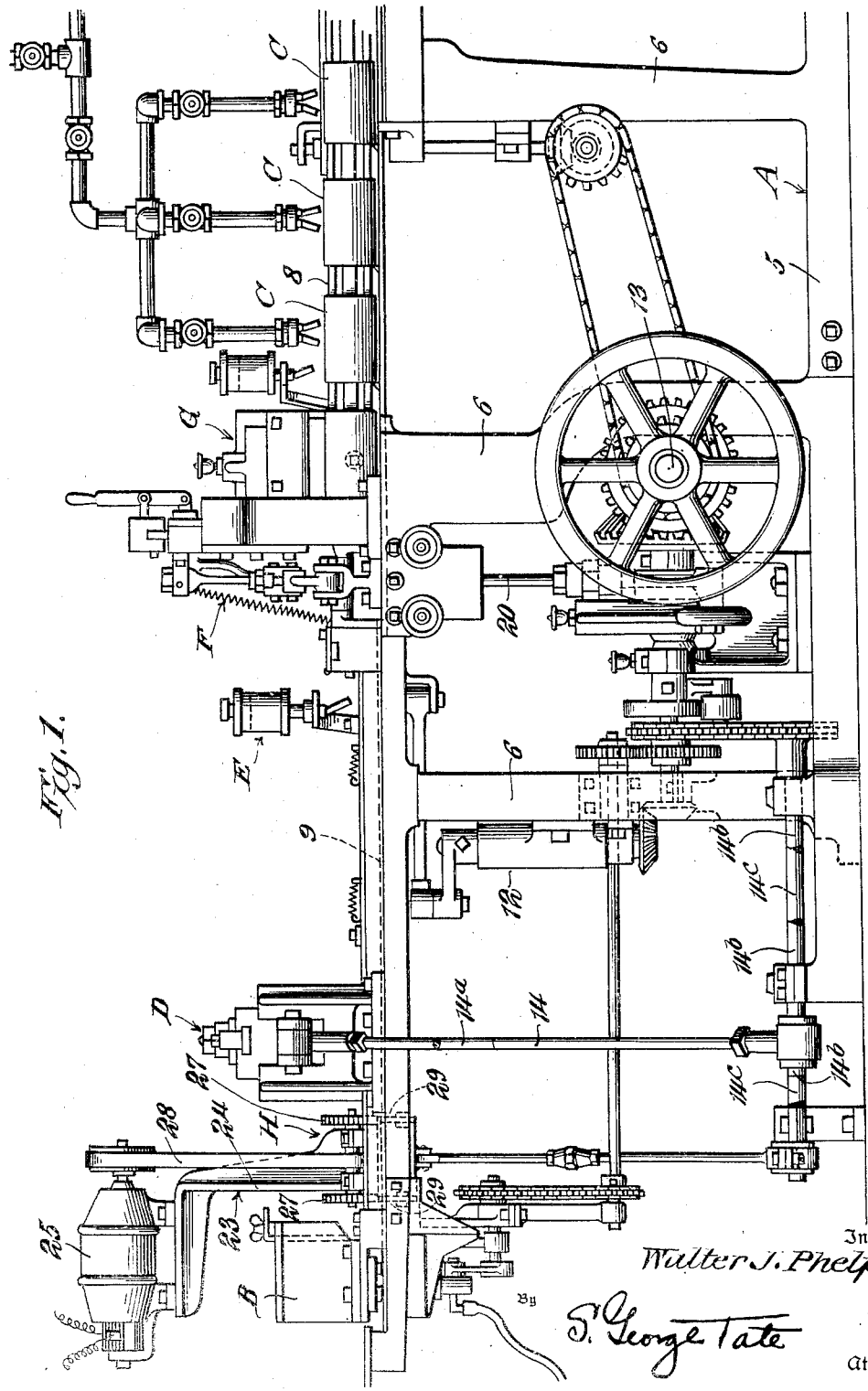

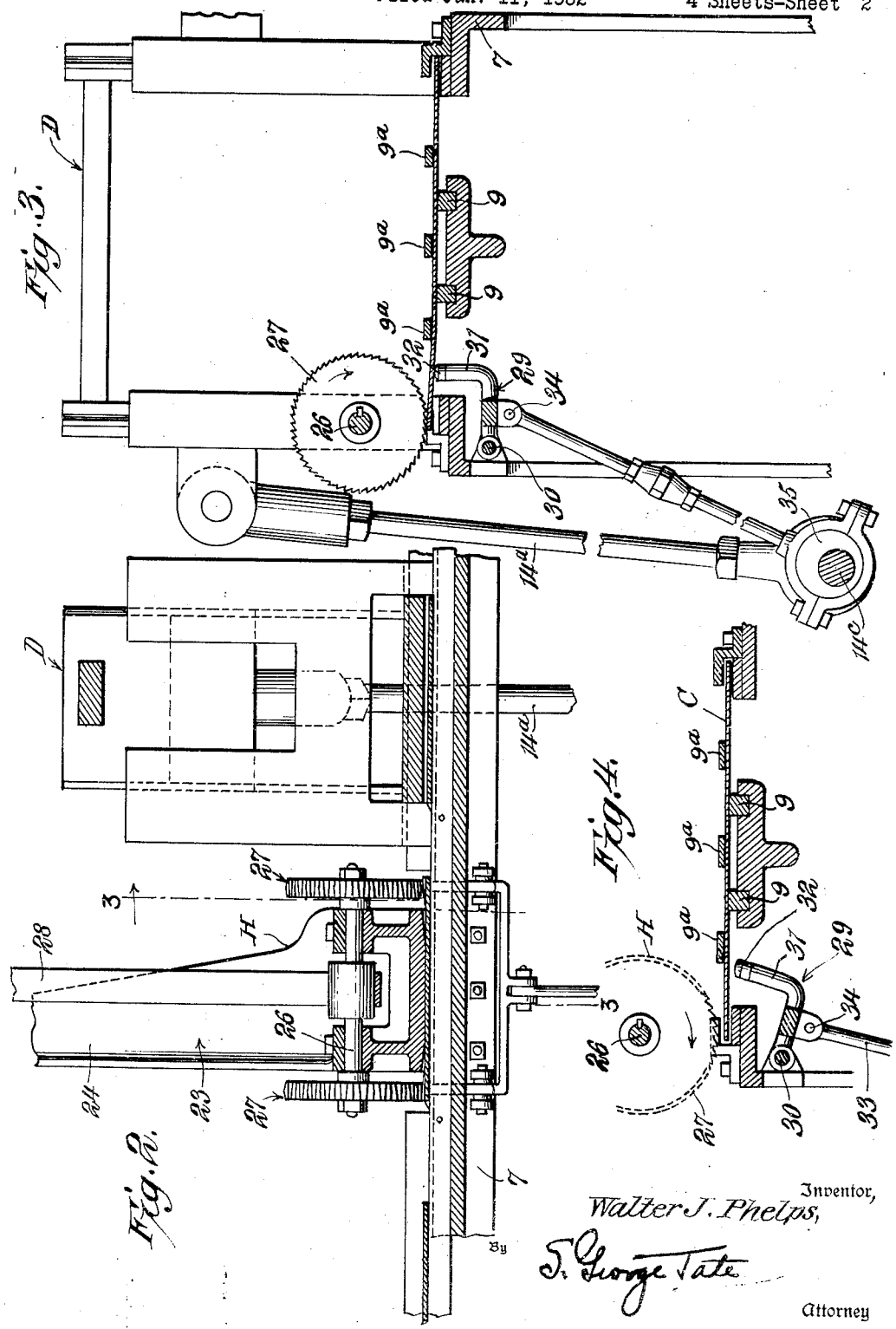

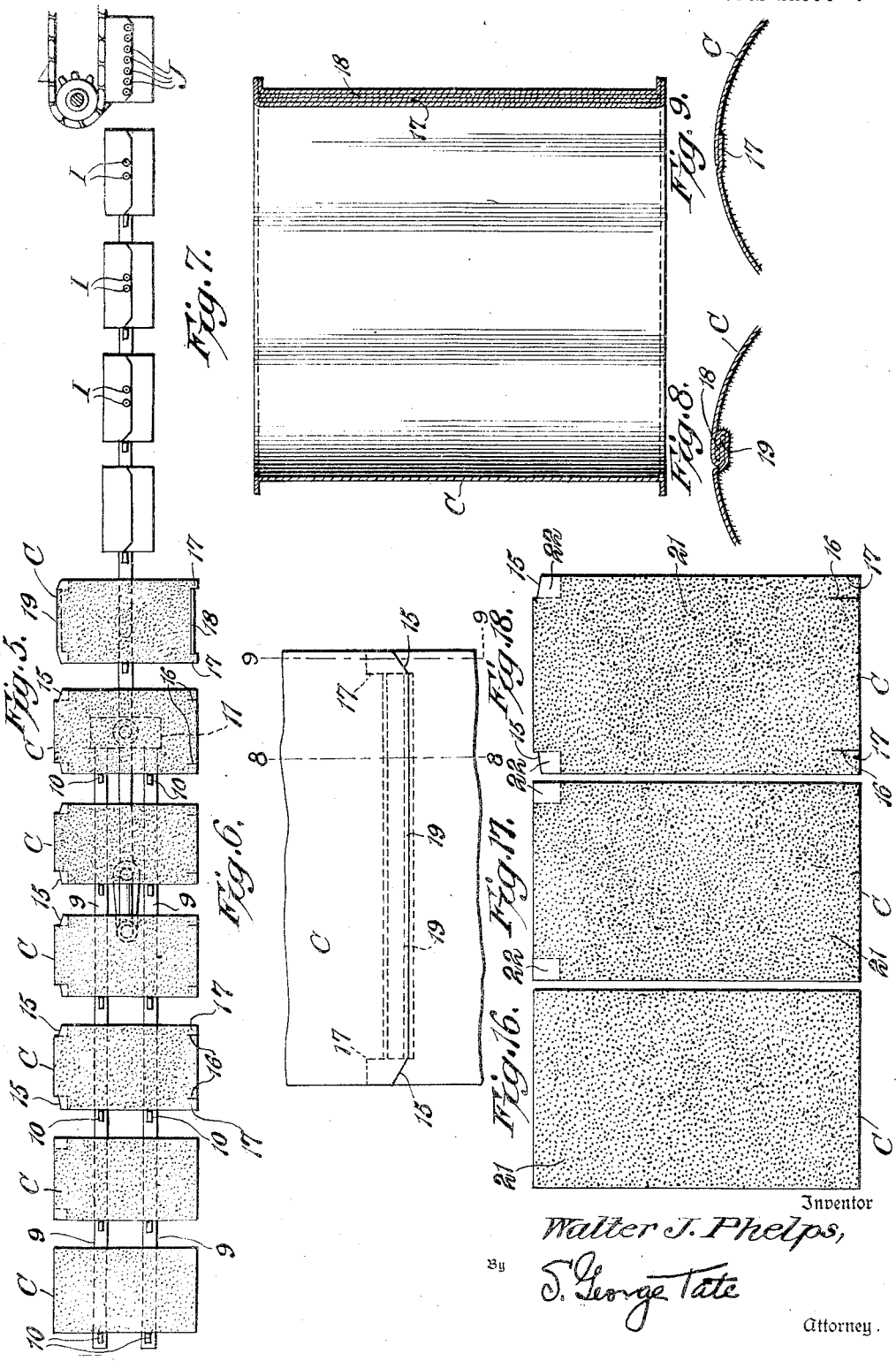

1,918,662

UNITED STATES PATENT OFFICE

WALTER J. PHELPS, OF BALTIMORE, MARYLAND, ASSIGNOR TO PHELPS CAN COMPANY, OF BALTIMORE, MARYLAND, A CORPORATION OF WEST VIRGINIA

MACHINE FOR SIDE SEAMING CAN BODIES

Application filed January 11, 1932. Serial No. 586,018.

This invention relates to new and useful improvements in machines for side seaming can bodies of the "lock and lap" type, and more particularly in the machine for removing portions of the lacquer coating of the can body prior to the side seam soldering operation.

The "lock and lap" type of side seam includes a central double lock portion and end lapped portions. The lock extends throughout the length of the body except for the relatively short lapped end portions, and embodies four thicknesses of sheet metal whereas the lapped portions each embodies but two thicknesses of sheet metal. In order to reduce the ends of the side seams to the two thicknesses, it is the practice to cut off or bevel the corner portions at one side of the blank, and at the other side of the blank to slit or notch the corners longitudinally to form resultant tongues which together with the single thickness of the can body form overlapping seam ends of but two thicknesses each. The practice heretofore, when it has been desired to build cans with lacquered inside surfaces, has been to use metal sheets which are lacquered upon one entire face thereof, and in forming a side seam of the "lock and lap" type it has been necessary to fold the can body so as to bring the lacquered surface inside at the short lapped portions. Practice has demonstrated that these lacquered surfaces at the end lapped portions of the side seam result in considerable trouble and loss from leaks due to imperfect soldering brought about by the solder failing to adhere to the lacquered surfaces. In order to solder side seams of inside lacquered can bodies, it has been necessary heretofore, to apply enough heat to melt the lacquer and boil or cook it out of the lap joint before the solder could possibly unite the two thicknesses of the lap. Such extreme heat largely dissipates or burns away the soldering flux which is necessary for good soldering, and furthermore, the extreme heat within the lap joints causes more or less warping of the lap ends of the seam which results in later causing leaks in the cans brought about when the can ends are double seamed onto the can bodies.

Among the several objects of my invention are to provide a method and machine for side seaming lacquered can bodies of the "lock and lap" type, wherein the surface of the lapped end portions of the can body is cleaned of the lacquer coating prior to the soldering operation, whereby the lapped ends of the body will be firmly united by the solder and the heretofore loss by reason of leaky cans will be avoided; to provide a constantly rotating cleaning element, against which the can body blanks are intermittently moved during the passage of the blanks from the hopper to the can body forming mechanism, and to provide a machine for carrying out the steps of my method and which machine is extremely simple in construction and durable in operation.

With these and other objects in view which will more fully appear, the nature of the invention will be more clearly understood by following the description, the appended claims, and the several views illustrated in the accompanying drawings.

In the drawings:—

Figure 1 is a front elevation of the left hand end of a side seaming machine embodying my invention, Figure 2 is an enlarged vertical section taken through the cleaning mechanism, Figure 3 is a vertical sectional view taken on the line 3—3 of Figure 2, one of the can body blanks being disposed against the rotary cleaning elements, Figure 4 is a detail sectional view showing the normal position of the can body blank relative to the rotary cleaning element, Figure 5 is a diagrammatic plan view illustrating the successive steps employed in carrying out my invention, Figure 6 is a fragmentary plan view of a side can seam, Figure 7 is a vertical sectional view through a can body, Figure 8 is a sectional view taken on the line 8—8 of Figure 6, Figure 9 is a sectional view taken on the line 9—9 of Figure 6, Figure 10 is an enlarged top plan view showing the relation between the can body blank and the cleaning mechanism, Figure 11 is an enlarged detail side elevation of one of the rotary cleaning elements, the view showing the scraping or cutting teeth arranged in units of the three teeth each, Figures 12, 13 and 14 are transverse sectional view of the respective teeth of each unit, Figure 15 is a plan view of the cutting element, and Figures 16, 17 and 18 respectively show the lacquered surface of a blank in different successive steps of its formation.

Like reference numerals designate corresponding parts throughout the several figures of the drawings.

Referring to the accompanying drawings, the can side seaming machine which embodies my invention includes a support or framework A comprising a base 5, standards 6, and a table 7.

Supported on the table 7 adjacent the left hand end thereof, is a hopper B which contains a plurality of superposed can body blanks C. Centrally mounted upon the table 7 and extending longitudinally thereof is a soldering horn 8 of the usual construction, the left hand end thereof being disposed in spaced relation to the hopper B. Slidably mounted on the left hand end of the table 7 is a pair of spaced and longitudinally extending pusher bars 9, 9, each including upwardly spring pressed blank feeding dogs 10 of the usual construction. Extending longitudinally of the table and disposed in cooperative relation with the pusher bars 9 is a plurality of holddown bars 9ᵃ for the blanks C. The left hand ends of the pusher bars 9 are disposed under the hopper B in the usual manner and these bars are reciprocated longitudinally of the table through the medium of a cross head 11 which connects the right hand ends of the pusher bars and a driving connection, indicated as a whole by the reference numeral 12, between the cross head 11 and a main shaft 13 which is journaled in the support A. By means of the pusher bars 9, the blanks C are successively withdrawn from the stack of blanks within the hopper B and are intermittently moved along the table 7 toward the soldering horn 8 by means of the spring dogs 10. The blanks during their passage from the hopper B to the soldering horn 8 are intermittently fed past a cutting mechanism D which is operated from the main shaft 13 through the medium of front and rear pitmen 14, 14ᵃ driven from front and rear shafts 14ᵇ, 14ᶜ which in turn are operatively connected to the main shaft 13. The cutting mechanism D embodies a construction now in general use and functions during successive rest periods of the blanks to cut off or bevel the corners at one side of each blank as indicated at 15, 15, and form longitudinally extending notches or slits 16, 16 in the other side of the blank to form resultant tongues 17, 17. Supported on the table 7 and located between the cutting mechanism D and the soldering horn 8, is a fluxing means E which is disposed in cooperative relation with the opposite sides of the blanks as they are intermittently fed thereunder. Supported on the table 7 between the fluxing means E and the soldering horn 8 is an edging mechanism F which bends the side portions of each blank into upwardly and downwardly extending flanges 18 and 19 respectively, the flange 18 extending between the tongues 17, 17, and the flange 19 extending between the beveled corners 15, 15. The edging or flanging mechanism F is of the usual construction and is operated from the main shaft 13 through connections which are indicated as a whole by the reference numeral 20. Supported on the table 7 at the right of the flanging mechanism F and in registry with the left hand end of the soldering horn 8 is a forming mechanism G which functions during a rest period of the blank C to envelop the blank around the horn 8 and bend the flanges 18, 19 of the blank into a double interlock fold, the fold or seam being thus disposed at the top of the horn 8. Thus the double interlock seam fold is formed by four thicknesses of sheet metal. The forming mechanism G also functions to position the tongues 17, 17 in overlapped relation with the can body beyond the ends of the interfold. Thus the seam includes a centrally located lock or fold portion consisting of four thicknesses of sheet metal which extend throughout the length of the can body except for the extreme ends thereof where the relatively short lap seams are located, the lap seams embodying but two thicknesses of sheet metal. The forming mechanism G is operated from the flanging mechanism F in the usual manner. The can body after leaving the forming mechanism G is then subjected to a heating mechanism and then to a soldering mechanism, whereby the side seam is soldered, as described in my co-pending application Serial No. 572,404, filed Oct. 31, 1931.

The machine, and also the successive steps of the method, as thus far described are described in my co-pending application referred to above.

As previously explained, the present invention relates particularly to the method and machine for soldering the side seams of can bodies which have their inner surfaces coated with lacquer. Practice has demonstrated that in order to obtain a perfect union of the lapped end portions of the seam, it is necessary to remove the lacquer coating from these portions in order to permit the solder to properly adhere thereto. I have, therefore, provided a mechanism H for cleaning or removing the lacquer coating from the lapped end portions of the blank. This cleaning mechanism H may be located on the table 7 either immediately in front of the cutting mechanism D or immediately behind the same. I, however, prefer to position the cleaning mechanism H on the table 7 intermediate the hopper B and the cutting mechanism D. I have shown in Figure 16, a can body blank C having its inner surface coated with a lacquer 21. The blanks C are intermittently fed by the pusher bars 9 along the table 7 with their lacquered faces 21 uppermost. These blanks are periodically brought to a state of rest directly below the cleaning mechanism H and this mechanism functions to clean or remove the lacquer from both corner portions of the blank at one side thereof as indicated at 22, 22. These cleaned portions 22, 22 are opposite the tongues 17, 17 and consequently when the can body is formed, the outer or cleaned surfaces of the tongues 17 are disposed directly against the cleaned surfaces 22.

The cleaning mechanism H includes a bracket 23 which is rigidly mounted on the table 7 and includes a standard 24 on which is mounted an electric motor 25. Journaled on the bracket 23 is a rotary shaft 26, the shaft extending longitudinally of the table and being disposed at the rear of and in spaced relation to the holddown bars 9ª. Fixed to the shaft 26 are two rotary cutting or cleaning elements 27, 27, and the shaft 26 is constantly driven by the electric motor 25 through the medium of a belt 28. The rotary cutting or cleaning elements 27 are normally disposed above and in spaced relation to the adjacent side portion of each can body blank C when the latter is at rest and directly thereunder. In other words, the blanks C travel along the table 7 in a fixed horizontal plane which is below and in spaced relation to the rotary cutting or cleaning elements 27. The pusher bars 9 move the successive blanks C into a position directly under the cutting or cleaning elements 27 as shown particularly in Figure 10, and means are provided while the blank is at rest to simultaneously flex upwardly both adjacent end portions of the blank into engagement with both cutting or cleaning elements 27 whereby the lacquered coating is removed from both corner portions of the blank as shown at 22, 22 in Figure 17.

It is found in practice that these blanks are not entirely flat as they are often received with humps and depressions. The cutting or cleaning elements 27 are of like construction and therefore a description of one will suffice. Each element 27 is preferably formed of metal and includes a series of peripheral teeth which are arranged in successive groups of three teeth each, the groups being indicated by the reference character $a$ in Figure 11, and the teeth of each group being respectively indicated by the reference characters $x$, $y$, and $z$. The teeth extend transversely across the element. The cutting edge of the tooth $x$, as shown in Figure 12, is inclined relative to the axis of the element from one side of the element to the other, whereas the cutting edge of the tooth $y$, as shown in Figure 13, is inclined in the opposite direction, and the cutting edge of the tooth $z$, as shown in Figure 14 is downwardly inclined from the center to opposite sides of the element.

In order to flex the adjacent side portion of the blank C upwardly into cutting or cleaning relation with the rotary elements 27, I have provided a lifter lever 29 which is journaled on the table as at 30 and includes two upwardly extending arms 31, 31, each being provided at its extremity with a yieldable tip 32 formed of rubber or the like. The lifter lever 29 is oscillated about its pivot 30 through the medium of a link 33 which is pivotally connected at its upper end as at 34 to the lever 29, the lower end of the link being engaged with an eccentric 35 fixed to the shaft 14$^c$ which extends to the left beyond the shaft 14$^b$. The arms 31, 31 of the lever 29 engage the under face of the blank C intermediate the rotary cleaning elements 27 and the adjacent holddown bar 9ª, as shown in Figures 3 and 4. As previously explained and as shown in Figure 4, the blank C is normally disposed below and in spaced relation to the cleaning elements 27. Consequently when the lift lever 29 is swung upwardly under the influence of the eccentric 35, the adjacent side of the blank C will be flexed upwardly into contact with the rotary cleaning elements 27, and by reason of the inclined teeth $x$, $y$, $z$ of the cutting elements, the corner portions of the blank will be thoroughly cleaned of lacquer as shown at 22, 22 regardless of the fact that the blank may contain humps and depressions as previously explained, the cleaned spaces being slightly wider and slightly longer than the corresponding tongues 17, 17. When the lift lever 29 is swung downwardly the adjacent side portion of the blank C will automatically return to its normal position upon the table 7 and out of contact with the cutting elements 27.

The machine is operated at a very high speed, and the cleaner elements 27 are rotated at a very high speed. Consequently, the blank remains stationary under the cleaning mechanism for a very small fractional part of a second, and during this time the side portion of the blank is flexed upwardly into engagement with the rapidly revolving cleaning elements and returned to normal position.

In operation, the blanks C are first placed in the hopper B with their lacquered surfaces 21 uppermost. The pusher bars 9 intermittently feed the bottom blanks from the hopper and successively convey them to the cleaning mechanism H. While each blank is at rest under the cleaning mechanism, the lacquer is removed from the corner portions of the adjacent side, as shown at 22, 22 in Figure 17. The blanks are then intermittently conveyed to the cutting mechanism D and while the blank is stationary, the corners of the cleaned portions 22, 22 are beveled as at 15, and simultaneously the slits or notches 16, 16 are formed in the opposite side of the blank to form resultant tongues 17, 17. Thus the cleaning mechanism H and the cutting mechanism D are disposed one in advance of the other and it will be understood that either may be disposed in advance of the other. The blanks are then successively conveyed from the cutting mechanism D past the fluxer E, then to the flanging mechanism F which forms the flanges 18 and 19, then to the forming mechanism G which bends the blanks around the initial end of the soldering horn 8 and presses the flanges 18 and 19 into interlocking engagement, the outer surfaces of the tongues 17, 17 being disposed under and against the cleaned surfaces 22, 22 to thereby insure the lapped ends of the side seam being properly soldered, and the formed can body is then subjected to a primary heating means I and a secondary heating means J, and to a soldering mechanism, which are shown and described in my co-pending application referred to above.

It is of course to be understood that the details of structure and arrangements of parts may be variously changed and modified without departing from the spirit and scope of my invention.

I claim:—

1. In a "lock and lap" can side seaming machine, the combination with a surface cleaning mechanism and a cutting mechanism arranged one in advance of the other, the surface cleaning mechanism including a pair of constantly rotating cleaning elements, and means for intermittently and progressively conveying a can body blank having a lacquered face past said mechanisms whereby the lacquer on the corner portions at one side of the blank will be removed and said corner portions will be beveled, and the corner portions on the opposite side of the blank will be notched to form resultant tongues.

2. In a "lock and lap" can side seaming machine, the combination with a surface cleaning mechanism and a cutting mechanism arranged one in advance of the other, the surface cleaning mechanism including a pair of constantly rotating cleaning elements normally disposed above one side of the blank and in spaced relation to the plane of the blank, means for conveying the blank from one mechanism to the other, and means for relatively moving the cleaning elements and the adjacent side portion of the blank into cleaning engagement.

3. In a "lock and lap" can side seaming machine, the combination with a surface cleaning mechanism and a cutting mechanism arranged one in advance of the other, the surface cleaning mechanism including a pair of constantly rotating cleaning elements normally disposed above one side of the blank and in spaced relation to the plane of the blank, means for conveying the blank from one mechanism to the other, and means for moving the side of the blank under the cleaning elements upwardly into engagement with said elements.

4. In a "lock and lap" can side seaming machine, the combination with a surface cleaning mechanism and a cutting mechanism arranged one in advance of the other, the surface cleaning mechanism including a pair of constantly rotating cleaning elements, each element comprising a metal cutter having peripheral teeth whose cutting edges are inclined to the axis of the element.

5. In a "lock and lap" can side seaming machine, the combination with a surface cleaning mechanism and a cutting mechanism arranged one in advance of the other, the surface cleaning mechanism including a pair of constantly rotating cleaning elements, each element comprising a metal cutter having peripheral teeth arranged in successive groups of three teeth each, two of said teeth having their cutting edges respectively inclined in opposite directions relative to the axis of the element and the third tooth having its cutting edge downwardly inclined in opposite directions from the center relative to the axis of the element.

6. In a "lock and lap" can side seaming machine, the combination with a table, of a hopper mounted thereon for containing a plurality of superposed can body blanks having their lacquered faces uppermost, a vertically reciprocatory cutting mechanism mounted on the table in spaced relation to the hopper for beveling the corner portions of the blank at one side thereof and notching the corner portions at the other side of the blank to form resultant tongues, a cleaning mechanism mounted on the table at one side of the cutting mechanism for removing the lacquer from one of the first mentioned corner portions of the blank, and means for intermittently and successively conveying the blanks along the table from the hopper to one of said mechanisms and then to the other of said mechanisms.

7. In a "lock and lap" can side seaming machine, the combination with a table, of a hopper mounted thereon for containing a plurality of superposed can body blanks having their lacquered faces uppermost, a vertically reciprocatory cutting mechanism mounted on the table in spaced relation to the hopper for beveling the corner portions of the blank at one side thereof and notching the corner portions at the other side of the blank to form resultant tongues, a cleaning mechanism mounted on the table at one side of the cutting mechanism for removing the lacquer from the first mentioned corner portions of the blank, and means for intermittently and successively conveying the blanks along the table from the hopper to one of said mechanisms and then to the other of said mechanisms.

8. In a "lock and lap" can side seaming machine, the combination with a table, of a hopper mounted thereon for containing a plurality of superposed can body blanks having their lacquered faces uppermost, a vertically reciprocatory cutting mechanism mounted on the table in spaced relation to the hopper for beveling the corner portions of the blank at one side thereof and notching the corner portions at the other side of the blank to form resultant tongues, a cleaning mechanism mounted on the table at one side of the cutting mechanism for removing the lacquer from the first mentioned corner portions of the blanks, said cleaning mechanism comprising a pair of constantly rotating cleaning elements disposed above the horizontal plane of the blanks and above the first mentioned corner portions of the blank, and means for relatively moving the cleaning elements and the adjacent side portion of the blank into cleaning engagement, and means for intermittently and successively conveying the blanks along the table from the hopper to one of said mechanisms and then to the other of said mechanisms.

9. In a "lock and lap" can side seaming machine, the combination with a table, of a hopper mounted thereon for containing a plurality of superposed can body blanks having their lacquered faces uppermost, a vertically reciprocatory cutting mechanism mounted on the table in spaced relation to the hopper for beveling the corner portions of the blank at one side thereof and notching the corner portions at the other side of the blank to form resultant tongues, a cleaning mechanism mounted on the table at one side of the cutting mechanism for removing the lacquer from the first mentioned corner portions of the blank, and means for intermittently and successively conveying the blanks along the table from the hopper to one of said mechanisms and then to the other of said mechanisms comprising pull bars mounted on the table for reciprocation longitudinally thereof and a plurality of holddown bars mounted on the table above the blanks and at one side of the cleaning elements, a lifter lever pivoted to the table below the blank and engageable with the side of the blank between the cleaning elements and the adjacent holddown bar, and means for positively reciprocating the lifter lever to flex the adjacent side of the blank into engagement with the cleaning elements.

10. In a "lock and lap" can side seaming machine, the combination with a table, of a hopper mounted thereon for containing a plurality of superposed can body blanks having their lacquered faces uppermost, a vertically reciprocatory cutting mechanism mounted on the table in spaced relation to the hopper for beveling the corner portions of the blank at one side thereof and notching the corner portions at the other side of the blank to form resultant tongues, a cleaning mechanism mounted on the table at one side of the cutting mechanism for removing the lacquer from the first mentioned corner portions of the blanks, said cleaning mechanism comprising a pair of constantly rotating cleaning elements disposed above the horizontal plane of the blanks and above the first mentioned corner portions of the blank, each element comprising a metal cutter having peripheral teeth arranged in successive groups of three teeth each, two of said teeth having their cutting edges respectively inclined in opposite directions relative to the axis of the element and the third tooth having its cutting edge downwardly inclined in opposite directions from the center relative to the axis of the element, and means for relatively moving the cleaning elements and the adjacent side portion of the blank into cleaning engagement, and means for intermittently and successively conveying the blanks along the table from the hopper to one of said mechanisms and then to the other of said mechanisms.

11. In a "lock and lap" can side seaming machine, a cleaning mechanism for removing the lacquer coating from a corner portion of a can body blank, comprising a constantly rotating cleaning element normally disposed above and in spaced relation to the portion of the blank to be cleaned, and means for relatively moving the cleaning element and the adjacent portion of the blank into cleaning engagement.

12. In a "lock and lap" can side seaming machine, a cleaning mechanism for removing the lacquer coating from a corner portion of a can body blank, comprising a constantly rotating cleaning element normally disposed above and in spaced relation to the portion of the blank to be cleaned, said element comprising a metal cutter having peripheral teeth arranged in successive groups of three teeth each, two of said teeth having their cutting edges respectively inclined in opposite directions relative to the axis of the element and the third tooth having its cutting edge downwardly inclined in opposite directions from the center relative to the axis of the element, and means for relatively moving the cleaning element and the adjacent portion of the blank into cleaning engagement.

13. In a "lock and lap" can side seaming machine, a cleaning mechanism for removing the lacquer coating from a corner portion of a can body blank, comprising a constantly rotating cleaning element normally disposed above and in spaced relation to the portion of the blank to be cleaned, said element comprising a metal cutter having peripheral teeth arranged in successive groups of three teeth each, two of said teeth having their cutting edges respectively inclined in opposite directions relative to the axis of the element and the third tooth having its cutting edge downwardly inclined in opposite directions from the center relative to the axis of the element, a lifter lever pivoted to the table below the blank and engageable with the side of the blank between the cleaning element and the adjacent holddown bar, and means for positively reciprocating the lifter lever to flex the adjacent side of the blank into engagement with the cleaning element, and means for relatively moving the cleaning element and the adjacent portion of the blank into cleaning engagement.

WALTER J. PHELPS.